United States Patent
Lee

(10) Patent No.: US 11,216,008 B2
(45) Date of Patent: Jan. 4, 2022

(54) AUTONOMOUS DRIVING CONTROL METHOD IN RESTRICTED AREA AND AUTONOMOUS DRIVING SYSTEM USING THE SAME

(71) Applicant: LG Electronics Inc., Seoul (KR)

(72) Inventor: Hansung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 16/555,534

(22) Filed: Aug. 29, 2019

(65) Prior Publication Data

US 2019/0384320 A1 Dec. 19, 2019

(30) Foreign Application Priority Data

Jul. 24, 2019 (KR) ........................ 10-2019-0089618

(51) Int. Cl.
G05D 1/02 (2020.01)
G05D 1/00 (2006.01)
H04L 9/08 (2006.01)

(52) U.S. Cl.
CPC ......... *G05D 1/0276* (2013.01); *G05D 1/0088* (2013.01); *G05D 1/0214* (2013.01); *H04L 9/088* (2013.01); *H04L 9/0894* (2013.01); G05D 2201/0213 (2013.01)

(58) Field of Classification Search
CPC .. G05D 1/0276; G05D 1/0088; G05D 1/0214; G05D 2201/0213; H04L 9/088; H04L 9/0894; H04L 2209/84; H04L 2209/805; H04L 9/0891; H04L 9/12; H04L 9/3226; G08G 1/017; B60W 2556/45; B60W 60/001; G01C 21/3407
See application file for complete search history.

(56) References Cited

U.S. PATENT DOCUMENTS

| | | | |
|---|---|---|---|
| 2004/0249519 A1* | 12/2004 | Frink | G05D 1/0061 701/3 |
| 2017/0146350 A1* | 5/2017 | Beaurepaire | H04W 12/08 |
| 2017/0336795 A1* | 11/2017 | Wei | G05D 1/0223 |
| 2019/0346840 A1* | 11/2019 | Valeri | E06B 11/02 |
| 2021/0020045 A1* | 1/2021 | Huang | B60W 30/10 |

* cited by examiner

*Primary Examiner* — Rodney A Butler
(74) *Attorney, Agent, or Firm* — Fish & Richardson P.C.

(57) ABSTRACT

An autonomous driving control method for a vehicle includes: converting a driving mode into a restricted area autonomous driving mode in which memory access, communication with a network, and information acquisition are restricted in a restricted area; transmitting a destination in the restricted area and an authentication key to a server by an autonomous driving system; checking validity of the authentication key, and generating a global path to the destination in the restricted area when the authentication key is valid, by the server; encrypting the global path and transmitting it with a decryption key to the autonomous driving system by the server; and restoring the encrypted global path using the decryption key by the autonomous driving system. Autonomous vehicles of the present disclosure may be associated with artificial intelligence modules, drones (unmanned aerial vehicles (UAVs)), robots, augmented reality (AR) devices, virtual reality (VR) devices, devices related to 5G service, etc.

13 Claims, 15 Drawing Sheets

AUTONOMOUS DRIVING CONTROL METHOD IN RESTRICTED AREA AND AUTONOMOUS DRIVING SYSTEM USING THE SAME

CROSS-REFERENCE TO RELATED APPLICATION

This application claims the benefit of Korean Patent Application No. 10-2019-0089618, filed on Jul. 24, 2019, the entire contents of which is incorporated herein by reference for all purposes as if fully set forth herein.

BACKGROUND

Field of the Disclosure

The present disclosure relates to an autonomous driving system and a control method thereof and, more particularly, to an autonomous driving control method in a restricted area and an autonomous driving system using the same.

Description of the Background

Vehicles, in accordance with the prime mover that is used, can be classified into an internal combustion engine vehicle, an external combustion engine vehicle, a gas turbine vehicle, an electric vehicle or the like.

An autonomous vehicle refers to a vehicle that can be driven by itself without operation by a driver or a passenger and an autonomous driving system refers to a system that monitors and controls such an autonomous vehicle so that the autonomous vehicle can be driven by itself.

SUMMARY

In restricted areas, for example, military areas, security sections, or the like, photographing may be prohibited or using and storing maps may be prohibited. For these restricted areas, it is impossible to generate a driving plan for autonomous driving. For example, map data are not provided in restricted areas due to security policies, so when applying existing autonomous driving methods or systems as they are, it is impossible to generate a route.

An object of the present disclosure is to solve the necessities and/or problems described above.

An object of the present disclosure is to provide an autonomous driving control method in a restricted area where autonomous driving is possible in a restricted area, and an autonomous driving system using the autonomous driving control method.

A autonomous driving control method in a restricted area according to an embodiment of the present disclosure includes: converting a driving mode of a vehicle into a restricted area autonomous driving mode, in which memory access, communication between the vehicle and an external network, and information acquisition are restricted, when the vehicle enters a restricted area; transmitting a destination in the restricted area and an authentication key to a restricted area management server in the restricted area by an autonomous driving system of the vehicle; checking validity of the authentication key, and generating a global path including route information to the destination in the restricted area when the authentication key is valid, by the restricted area management server; encoding the global path and transmitting a decryption key of the global path together with the encoded global path to the autonomous driving system by the restricted area management server; and restoring the encoded global path using the decryption key by the autonomous driving system.

An autonomous driving system of a vehicle according to an embodiment of the present disclosure includes: a requester that transmits a destination in a restricted area and an authentication key to a restricted area management server; a receiver that receives an encoded global path and a decryption key from the restricted area management server; a control system that converts a driving mode of the vehicle into a restricted area autonomous driving mode, in which memory access, communication between the vehicle and an external network, and information acquisition are restricted, and restores a global path by decoding the encoded global path using the decryption key received through the receiver, when the vehicle enters the restricted area; and an autonomous driving device that processes autonomous driving of the vehicle along the global path in the restricted area under control by the control system.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Hereinafter, embodiments of the disclosure will be described in detail with reference to the attached drawings.

The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereafter, a device that requires autonomous driving information and/or 5G communication (5th generation mobile communication) that an autonomous vehicle requires are described through a paragraph A to a paragraph G.

A. Example of Block Diagram of UE and 5G Network

Figure 1:
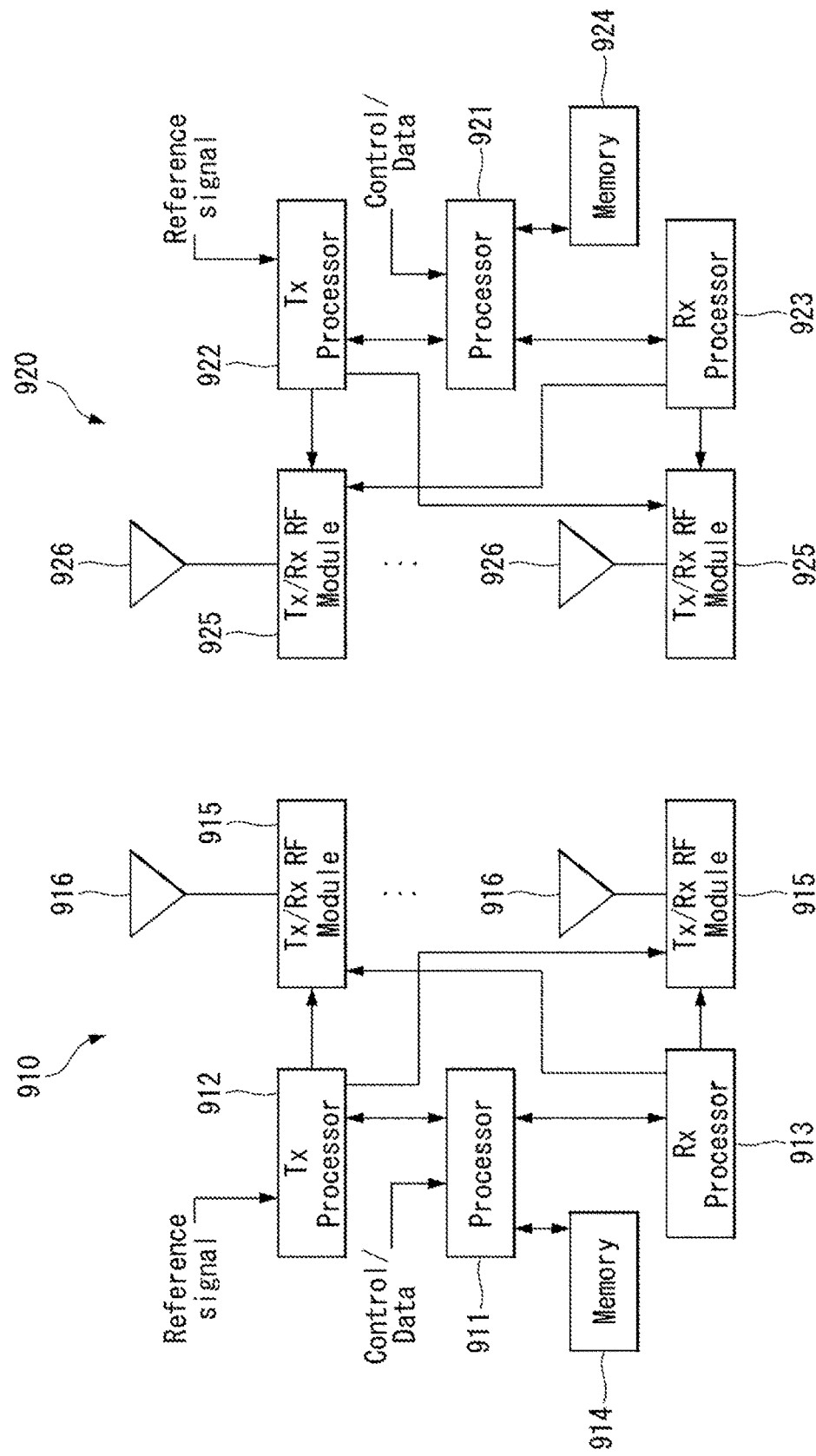
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HIVID)), etc. For example, the HIVID may be a display device worn on the head of a user. For example, the HIVID may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
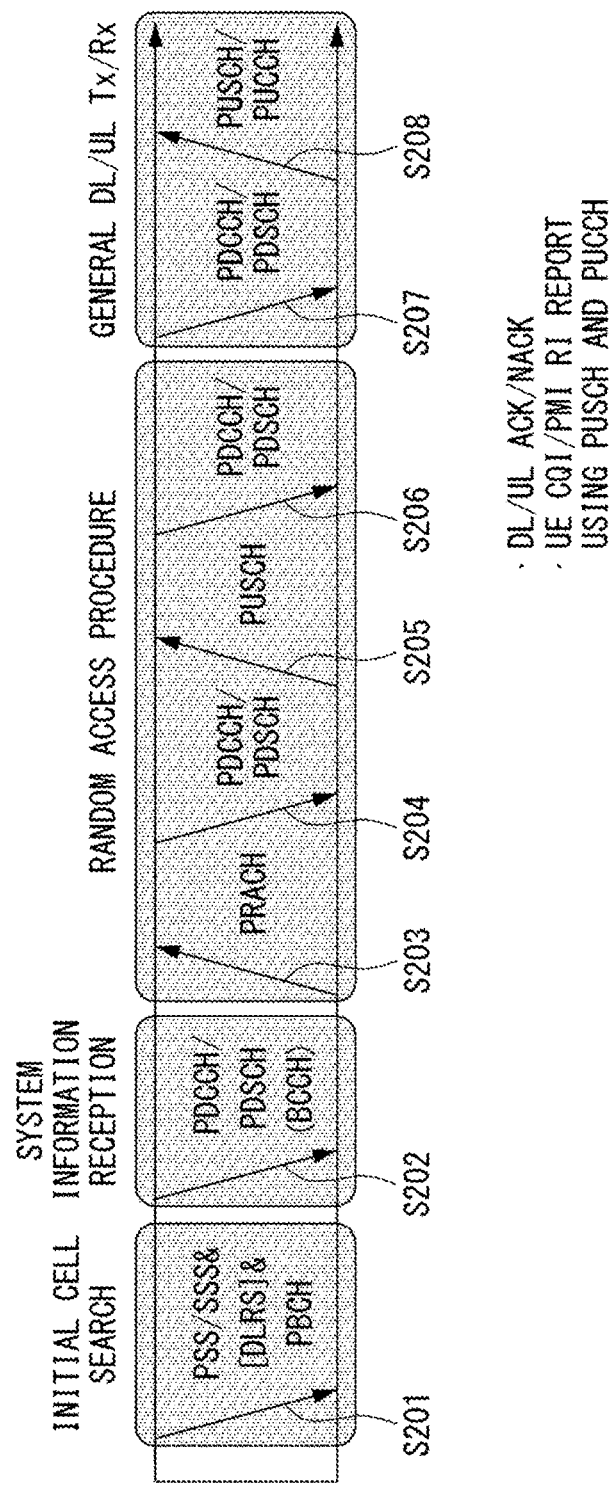
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI)

through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described. Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the OSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
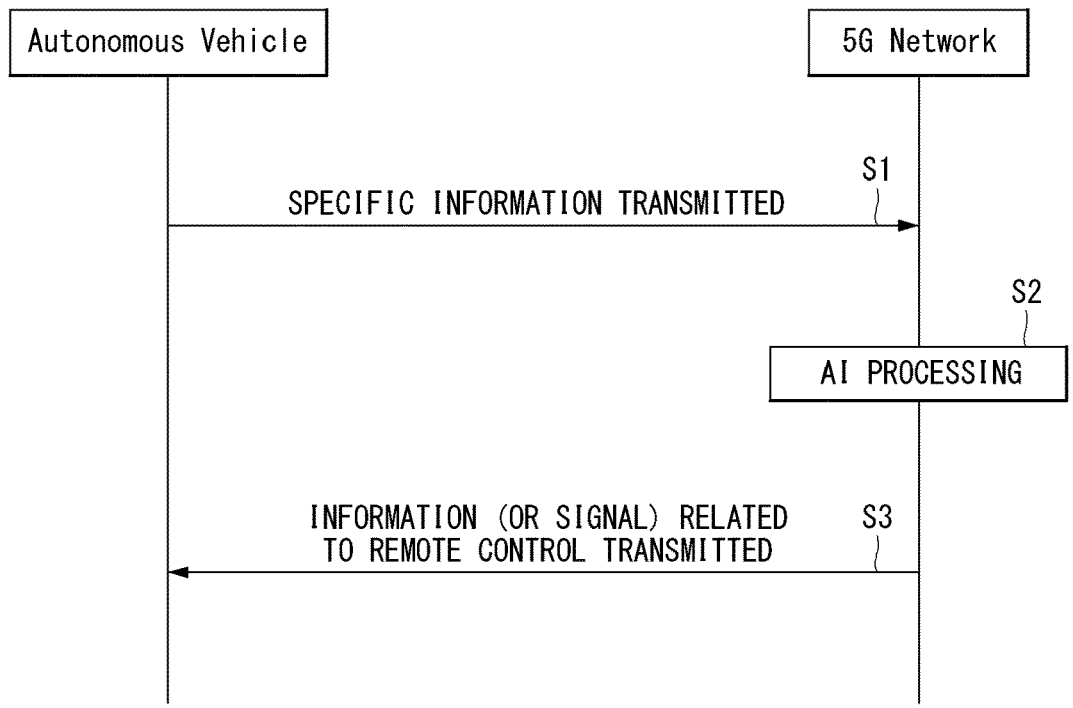
FIG. 3 shows an example of basic operations of an autonomous vehicle and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource.

The specific information can be transmitted through a narrowband of 6 resource blocks (RBs) or 1 RB.

H. Autonomous Driving Operation Between Vehicles Using 5G Communication

Figure 4:
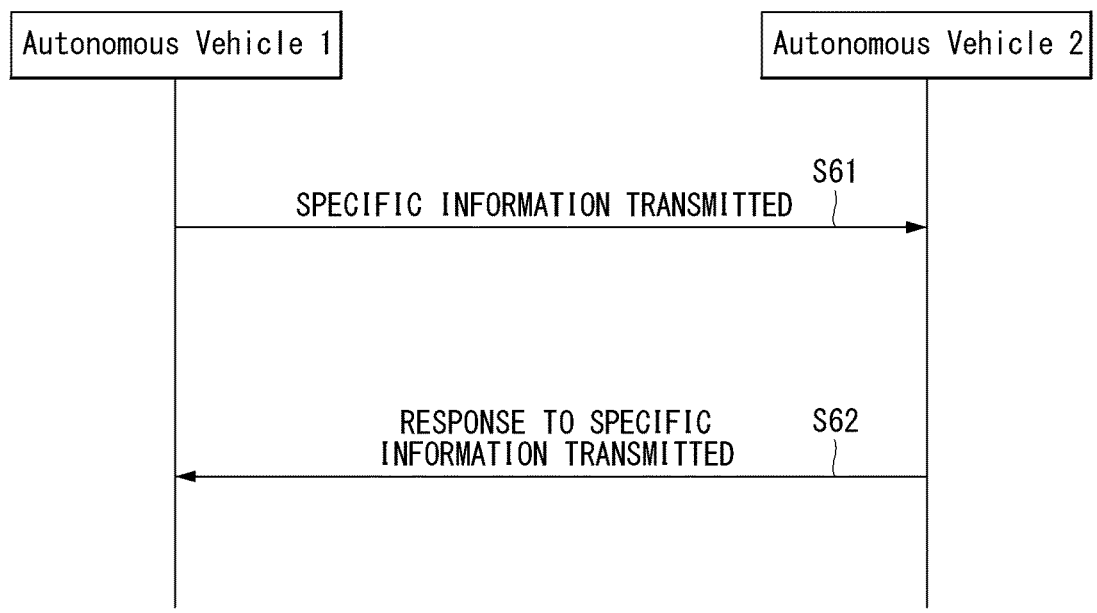
FIG. 4 shows an example of a basic operation between vehicles using 5G communication.

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present disclosure which will be described later and applied or can complement the methods proposed in the present disclosure to make technical features of the methods concrete and clear.

Driving (1) Exterior of Vehicle

Figure 5:
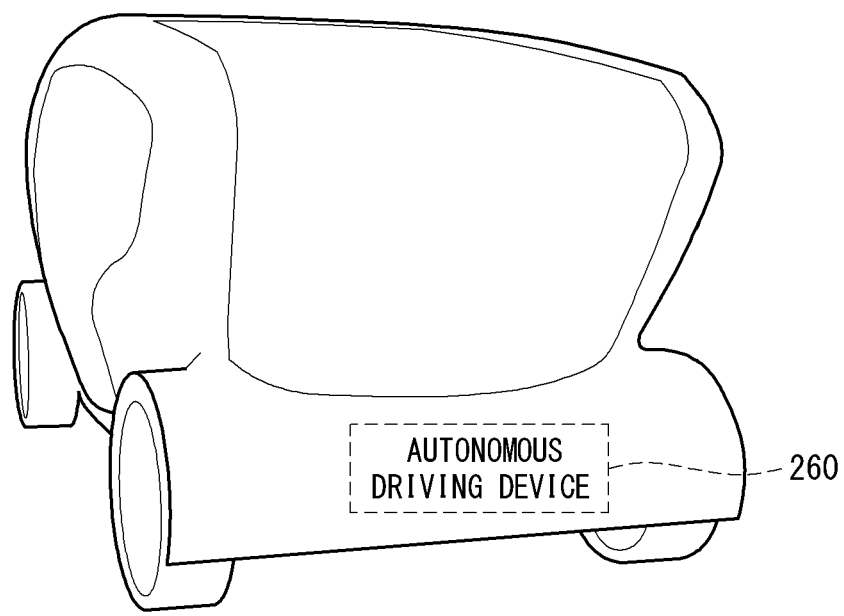
FIG. 5 illustrates a vehicle according to an embodiment of the present disclosure.
Figure 5:
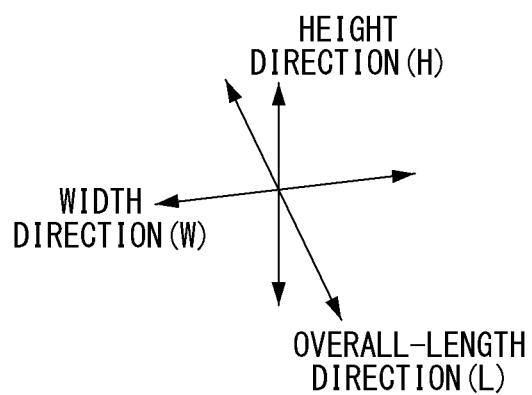

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
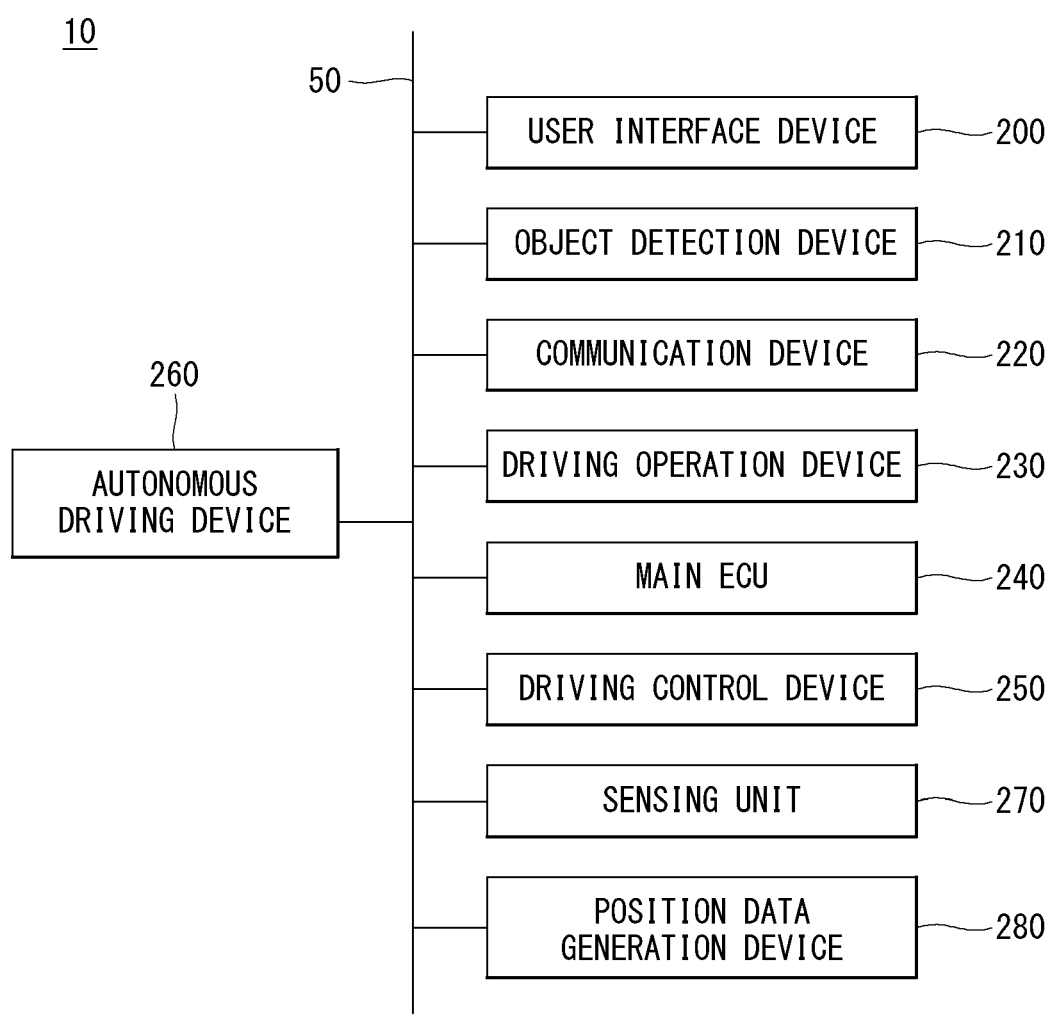
FIG. 6 is a control block diagram of the vehicle according to an embodiment of the present disclosure.

FIG. 6 is a control block diagram of the vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous driving device 260, a sensing unit 270, and a position data generation device 280. The object detection device 210, the communication device 220, the driving operation device 230, the main ECU 240, the driving control device 250, the autonomous driving device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle.

The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3 Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous driving device 260. For example, the driving control device 250 can control a power train, a steering device and a brake device on the basis of signals received by the autonomous driving device 260.

7) Autonomous Device

The autonomous driving device 260 can generate a route for self-driving on the basis of acquired data. The autonomous driving device 260 can generate a driving plan for traveling along the generated route. The autonomous driving device 260 can generate a signal for controlling movement of the vehicle according to the driving plan. The autonomous driving device 260 can provide the signal to the driving control device 250.

The autonomous driving device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous driving device 260 can perform switching from a self-driving mode to a manual driving mode or switching from the manual driving mode to the self-driving mode. For example, the autonomous driving device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 7:
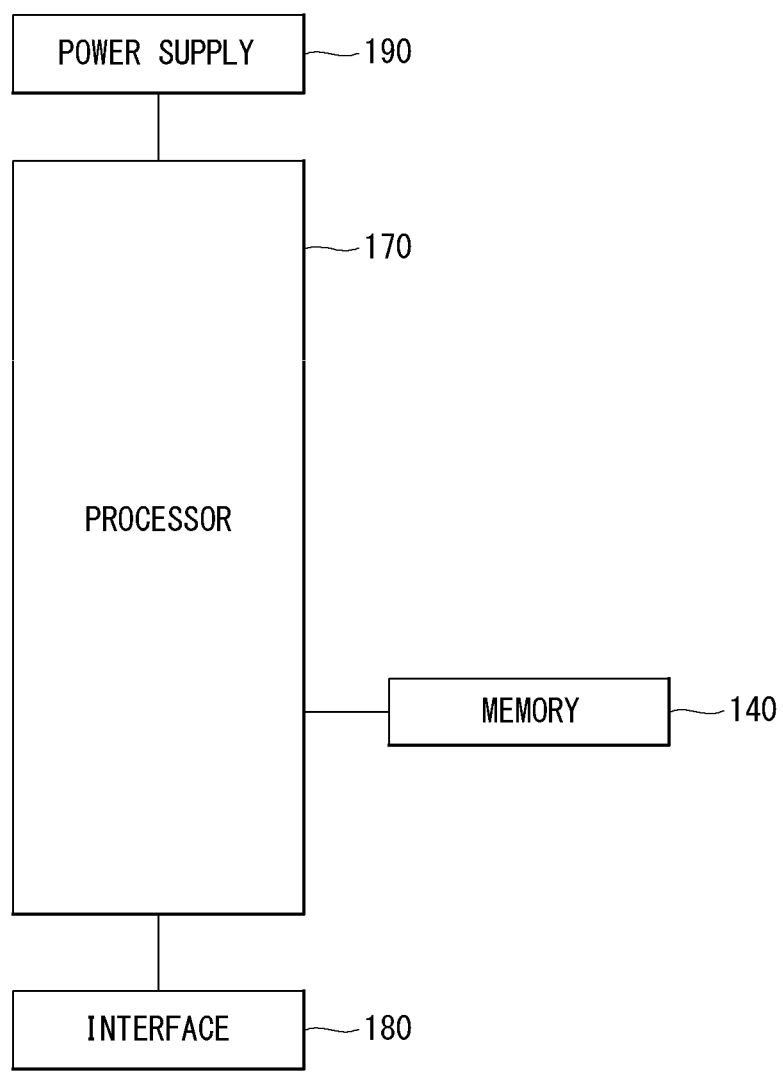
FIG. 7 is a control block diagram of an autonomous device according to an embodiment of the present disclosure.

FIG. 7 is a control block diagram of the autonomous device according to an embodiment of the present disclosure.

Referring to FIG. 7, the autonomous driving device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous driving device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous driving device 260. The power supply 190 can be provided with power from a power source (e.g., a battery) included in the vehicle 10 and supply the power to each unit of the autonomous driving device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous driving device 260 may include at least one printed circuit board (PCB). The memory 140, the interface 180, the power supply 190 and the processor 170 may be electrically connected to the PCB.

(4) Operation of Autonomous Device

Figure 8:
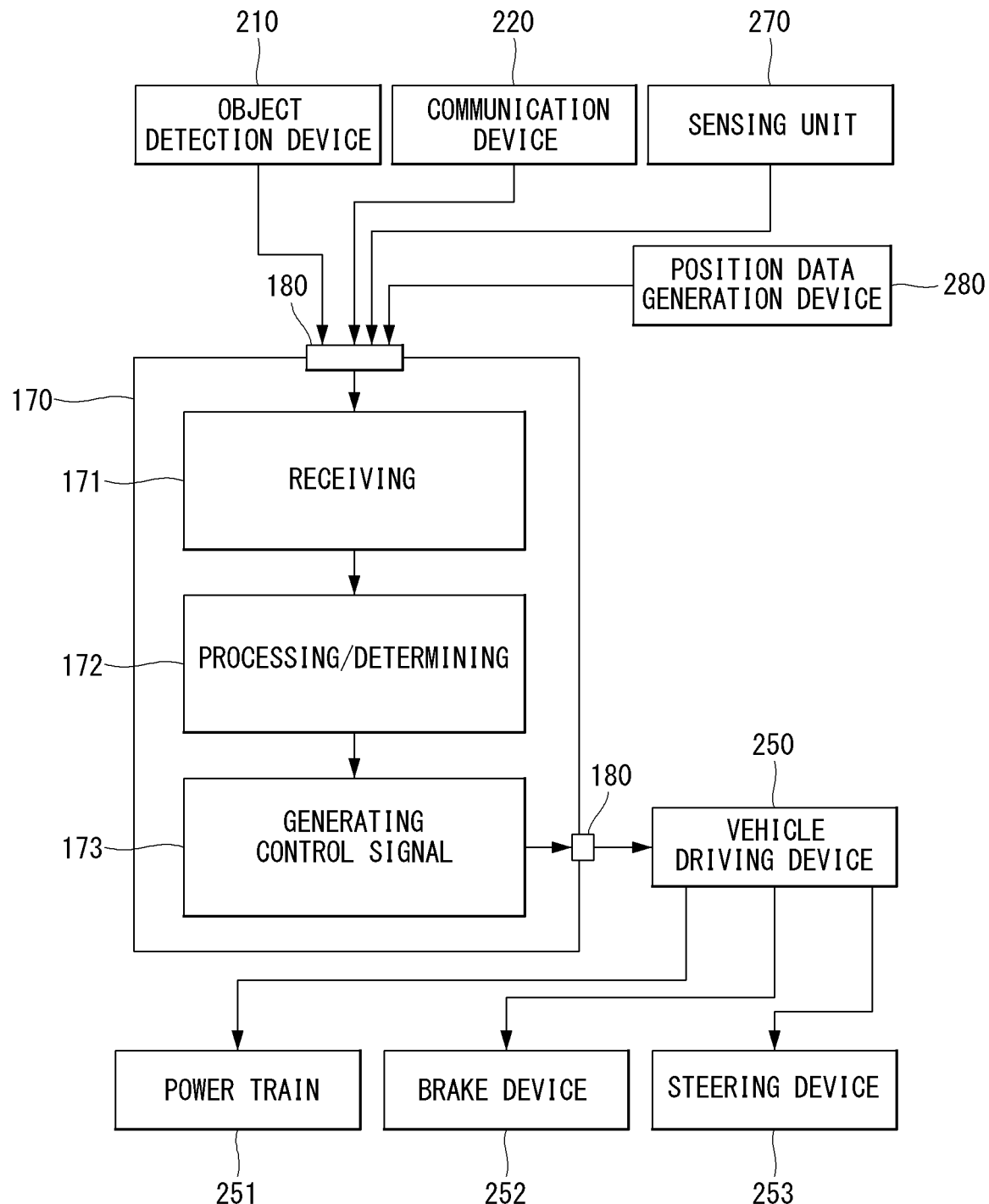
FIG. 8 is a diagram showing a signal flow in an autonomous vehicle according to an embodiment of the present disclosure.

FIG. 8 is a diagram showing a signal flow in an autonomous vehicle according to an embodiment of the present disclosure.

1) Reception Operation

Referring to FIG. 8, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Figure 9:
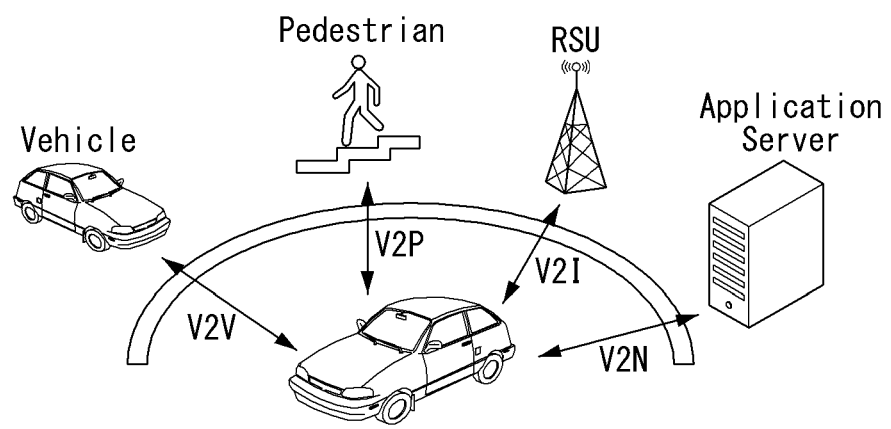
FIG. 9 is a diagram showing a V2X application.

FIG. 9 shows an example of types of V2X applications.

Four types of V2X applications can use "co-operative awareness" that provides more intelligent services for the final user. This means that it is possible to collect knowledge about a corresponding area environment (e.g., information received from an adjacent another vehicle or sensor equipment) such that entities such as a vehicle, a roadside infrastructure, an application server, and a pedestrian process and share corresponding knowledge to provide more intelligent information such as cooperative collision warning or autonomous driving.

These intelligence transport service and relevant message sets are defined in out-of-3GPP vehicle SDO (Standards Developing Organizations).

Three fundamental class road safety for providing ITS service: road safety, traffic efficiency, and other applications are, for example, described in ETSI TR 102 638 V1.1.1 "Vehicular Communications; Basic Set of Applications; Definitions".

A radio protocol architecture for a user plane for V2X communication and a radio protocol architecture for a control plane for V2X communication may be fundamentally the same as a protocol stack architecture for sidelink. The radio protocol architecture for a user plane may include PDCP (Packet Data Convergence Protocol), RLC (Radio Link Control), MAC (Medium Access Control), and physical (PHY) layers, and the radio protocol architecture for a control plane may include RRC (radio resource control), RLC, MAC, and physical layers. 3GPP TS 23.303, 3GPP TS 23.285, and 3GPP TS 24.386 may be referred for more detailed description about the protocol stack for V2X communication.

Figure 10:
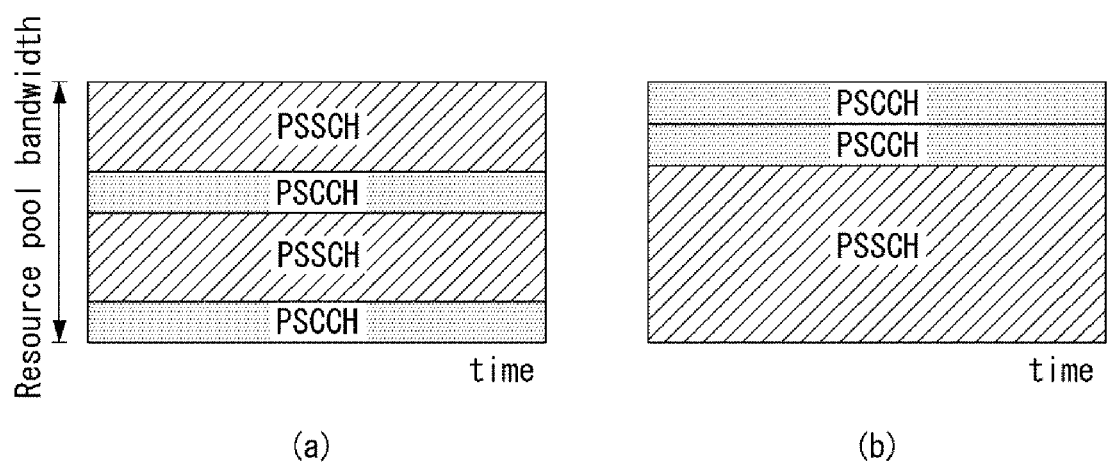
FIG. 10 is a diagram showing a resource allocation method in V2X sidelink.

FIG. 10 exemplifies a resource allocation method in sidelink in which V2X is used.

In sidelink, as in (a) of FIG. 10, different physical sidelink control channels (PSCCH) can be separately allocated at a frequency domain and different physical sidelink shared channels (PSSCH) can be separately allocated. Alternatively, as in (b) of FIG. 10, different PSCCHs may be continuously allocated at a frequency domain and PSSCHs may also be continuously allocated at a frequency domain.

In TDMA (time division multiple access) and FDMA (frequency division multiples access) systems, accurate time and frequency synchronization is necessary. When accurate time and frequency synchronization is not accurate, intersymbol interference (ISI) and intercarrier interference (ICI) are caused, whereby system performance is deteriorated. This is the same in V2X. In V2X, for time/frequency synchronization, it is possible to use a sidelink synchronization signal (SLSS) in a physical layer and use MIB-SL-V2X (master information block-sidelink-V2X) in an RLC (radio link control) layer.

The source of synchronization or the reference of synchronization in V2X is described. A US (user equipment) can acquire information about time/frequency synchronization from at least one of a GNSS (global navigation satellite systems), a BS (base station), or adjacent other UEs.

In detail, the UE may be directly synchronized to the GNSS or may be synchronized to another UE time/frequency-synchronized with the GNSS. When the GNSS is set as a synchronous source, the UE can calculate a DFN and a subframe number using UTC (Coordinated Universal Time) and (pre)-set DFN (direct frame number) offset.

Alternatively, the UE may be directly synchronized to the BS or may be synchronized to another UE time/frequency-synchronized with the BS. For example, when a UE is in a network coverage, the UE can receive synchronization information provided from a BS and can be directly synchronized to the BS. Thereafter, it is possible to provide synchronization information to another UE. When BS timing is set as a reference of synchronization, for synchronization and downlink measurement, the UE can obey a cell related to a corresponding frequency (when it is within a cell coverage at the frequency) and a primary cell or a serving cell (when it is out of the cell coverage at the frequency).

The BS (serving cell) can provide a synchronization setting for a carrier that is used in V2X sidelink communication. In this case, the UE can obey the synchronization setting received from the BS. If any cell is not detected from a carrier that is used in the V2X sidelink communication and synchronization setting is also not received from the serving cell, the UE may obey a predetermined synchronization setting.

Alternatively, the UE may be synchronized to another UE that could not acquire synchronization information directly or indirectly from the GNSS. A source and preference of synchronization may be set in advance to the UE or may be set through a control message that is provided by the BS.

The SLSS, which is a specific sequence of sidelink, may include a PSSS (primary sidelink synchronization signal) and a SSSS (secondary sidelink synchronization signal)

Each SLSS may have physical layer sidelink synchronization ID (identity) and the value thereof, for example, may be any one of 0 to 335. It may be possible to identify a synchronization source, depending on which value of the values is used. For example, 0, 168, and 169 may mean a GNSS (Global Navigation Satellite System), 1 to 167 may mean a BS, and 335 may mean out-of-coverage. Alternatively, in the values of the physical layer sidelink synchronization ID (identity), 0 to 167 may be values that are used by a network and 168 to 335 may be values that are used out of a network coverage.

A UE that provides synchronization information to another UE may be considered as operating as a synchronization reference. The UE can additionally provide information about synchronization together with an SLSS through an SL-BCH (sidelink broadcast channel).

In sidelink, there are transmission modes 1, 2, 3, and 4.

In the transmission modes 1/3, a BS performs resource scheduling for a UE1 through a PDCCH (in more detail, DCI) and the UE1 performs D2D/V2X communication with a UE2 in accordance corresponding resource scheduling. The UE1 can transmit SCI (sidelink control information) to the UE2 through a PSCCH (physical sidelink control channel) and then can transmit data based on the SCI through a PSSCH (physical sidelink shared channel). The transmission mode 1 can be applied to D2D and the transmission 3 can be applied to V2X.

The transmission modes 2/4 may be considered as modes in which a UE performs scheduling by itself. In more detail, the transmission mode 2 is applied to D2D and a UE can select resources by itself within a predetermined resource pool and perform D2D. The transmission mode 4 is applied to V2X and a UE can select resources by itself within a selection window through a sensing process and then can perform a V2X operation. The UE1 can transmit SCI to the UE2 through a PSCCH and then can transmit data based on the SCI through a PSSCH. Hereafter, the transmission mode may be briefly referred to as a mode.

Control information that a BS transmits to a UE through a PDCCH is referred to as DCI (downlink control information), whereas control information that a UE transmits to another UE through a PSCCH may be referred to as SCI. The SCI can transmit sidelink scheduling information. There may be various formats in the SCI, for example, there may be an SCI format 0 and an SCI format 1.

The SCI format 0 can be used for scheduling of a PSSCH. The SCI format 0 may include a frequency hopping flag (1 bit), a resource block allocation and hopping resource allocation field (the number of bits may become different, depending on the number of resource blocks of sidelink), a time resource pattern, an MCS (modulation and coding scheme), a time advance indication, a group destination ID, etc.

The SCI format 1 can be used for scheduling of a PSSCH. The SCI format 1 includes priority, resource reservation, frequency resource positions of initial transmission and retransmission (the number of bits may become different, depending on the number of subframe of sidelink), time gap between initial transmission and retransmission, an MCS, a retransmission index, etc.

The SCI format 0 can be used in the transmission modes 1 and 2 and the SCI format 1 can be used in the transmission modes 3 and 4.

Hereafter, resource allocation in the mode 3 and the mode 4 that are applied to V2X is described in more detail. The mode 3 is described first.

The mode 3 may be considered as scheduled resource allocation. A UE may be in an RRC_CONNECTED state to transmit data.

FIG. 10 exemplifies a case when a UE performs a mode 3 operation.

A UE can request a transmission/reception resource to a BS and the BS can schedule sidelink control information and/or a resource(s) related to transmission/reception of data for the UE. In this case, a sidelink SPS may be supported for scheduled resource allocation. The UE can transmit/receive the sidelink control information and/or the data to/from another UE using the allocated resource.

A UE can request a transmission/reception resource to a BS and the BS can schedule sidelink control information and/or a resource(s) related to transmission/reception of data for the UE. In this case, a sidelink SPS may be supported for scheduled resource allocation. The UE can transmit/receive the sidelink control information and/or the data to/from another UE using the allocated resource.

The mode 4 may be considered as UE autonomous resource selection. A UE can perform sensing for (re)selection of a sidelink resource. On the basis of the sensing result, the UE can randomly select/reserve a sidelink resource of the other resources except for a specific resource. The UE may perform maximally two parallel independent resource reservation processes.

As described above, the UE can perform sensing to select a mode 4 transmission resource.

For example, the UE can find out transmission resources that have been reserved by another UE or resources that are being used by another UE through sensing in a sensing window, and can randomly select a resource from resources with less interference of remaining resources in a selection window after excluding the found resource.

For example, the UE, in a sensing window, can decrypt a PSCCH including information about the cycles of reserved resources and can measure PSSCH RSRP from periodically determined resources on the basis of the PSCCH. It is possible to exclude resource, in which the PSSCH RSRP value exceeds a threshold, from the selection window. Thereafter, it is possible to randomly select a sidelink resource from the remaining resources in the selection window.

Resources with less interference, for example, corresponding to 20% from the bottom are found by measuring an RSSI (Received signal strength indication) of periodic resources in the sensing window. Further, it may be possible to randomly select a sidelink resource from resources included in the selection window of the periodic resources. For example, decrypting of the PSCCH fails, this method can be used.

The 5G communication technology described above can be applied in combination with methods proposed in the present disclosure to be described below or can be added to make the technical characteristics of the methods proposed in the present disclosure embodied or clear.

Hereafter, an autonomous driving control method in a restricted area according to an embodiment of the present disclosure and an autonomous driving system using the autonomous driving control method are described in detail.

Figure 11:
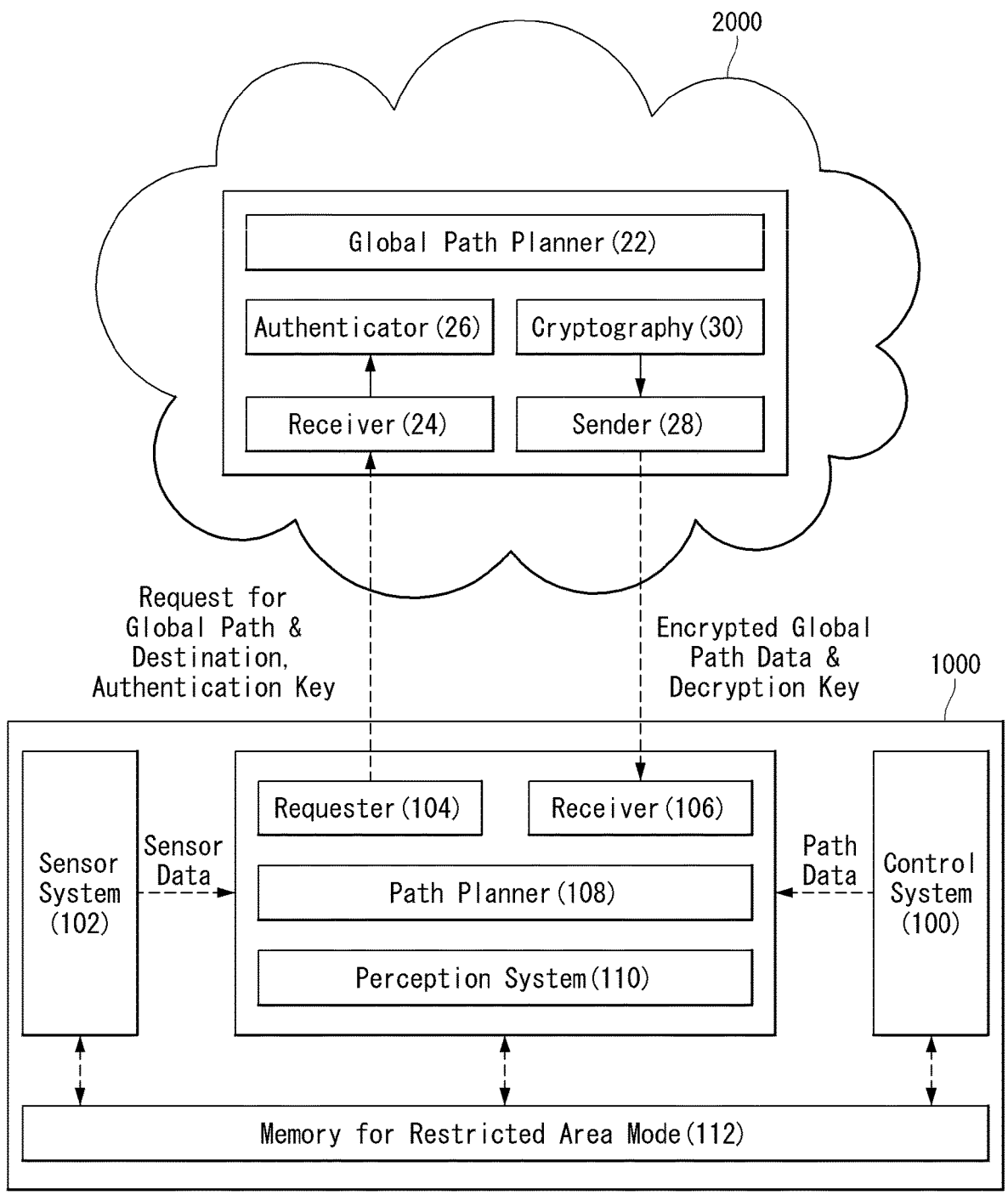
FIG. 11 is a diagram showing an autonomous driving system and a restricted area management server according to an embodiment of the present disclosure.
Figure 12:
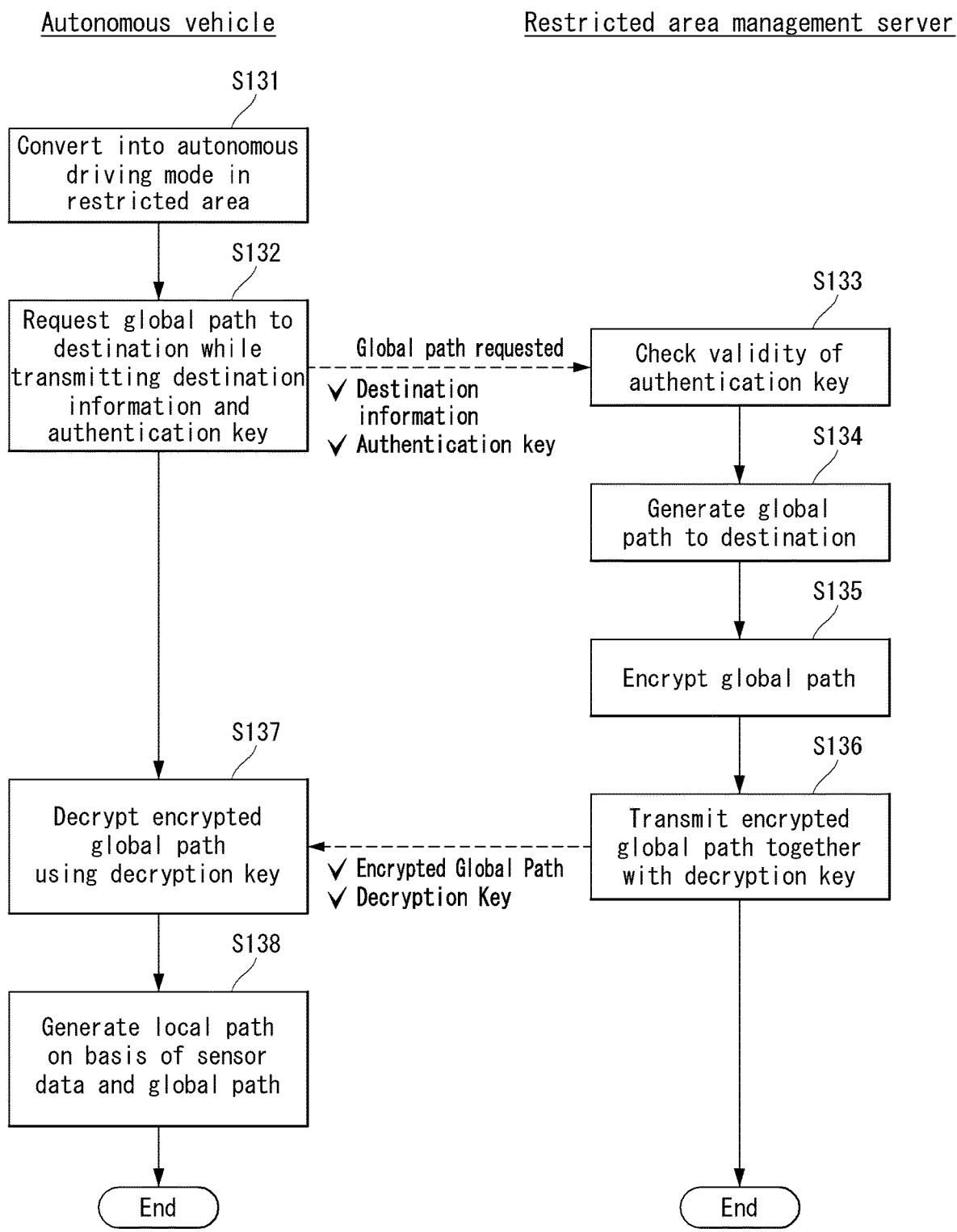
FIG. 12 is a flowchart showing an autonomous driving control method in a restricted area according to an embodiment of the present disclosure.

FIG. 11 is a diagram showing an autonomous driving system and a restricted area management server 2000 according to an embodiment of the present disclosure. FIG. 12 is a flowchart showing an autonomous driving control method in a restricted area according to an embodiment of the present disclosure.

Referring to FIGS. 11 and 23, an autonomous driving system converts a driving mode into a restricted area autonomous driving mode when a vehicle enters a restricted area (S131).

In the restricted area autonomous driving mode, the vehicle is restricted in memory access, external network connection, and information acquisition. The autonomous driving system can access only a data erasable memory 112 when leaving a restricted area of an available memory. For example, the memory 112 may be a volatile memory. In the restricted area autonomous driving mode, the autonomous driving system cannot access other storage media except for the memory 112 allowed in a restricted area.

An autonomous driving system 1000 is connected with a restricted area management server through a network in a restricted area.

In the restricted area autonomous driving mode, the autonomous driving system 1000 cannot be connected with another external network except for the network connected with the restricted area management server 2000. Accordingly, the autonomous driving system cannot transmit information obtained while the vehicle is driven in the restricted area to the outside of the restricted area.

In the autonomous driving system 1000, components related to autonomous driving in a restricted area includes a requester 104, a receiver 106, a path planner 108, a perception system 110, a sensor system 102, a control system 100, a memory 112, etc.

The restricted area management server 2000 (hereafter, referred to as a "server") includes a global path planner 22, an authenticator 26, a receiver 24, a cryptography 30, a sender 28, etc.

The control system 100 is a control system that converts the driving mode of the vehicle into the restricted area autonomous driving mode in which memory access, communication between the vehicle and an external network, and information acquisition are restricted, when the vehicle enters a restricted area.

The autonomous driving system 1000 transmits a destination and an authentication key to the server 2000 and requests a global path to the destination through the requester 104 when entering a restricted area (S132).

The receiver 24 of the server 2000 provides a destination and an authentication key to the authenticator 26 from the autonomous driving system 1000. The authenticator 26 checks validity of the authentication key received from the autonomous driving system 1000 and provides the result to the global path planner 22 (S133). When the authentication key received from the autonomous driving system 1000 is valid, the global path planner 22 generates a global path including destination information to the destination in the restricted area (S134). The global path is an autonomous driving route that is generated by the server 2000. The server 200 encrypts the global path that guides to the destination in the restricted area and is requested by the autonomous driving system 1000 through the cryptography 30 (S135). The encrypted global path is transmitted together with a decryption key to the autonomous driving system 1000 (S136).

The receiver 106 of the autonomous driving system 1000 provides the encrypted global path and the decryption key received from the server 2000 to the control system 100. The control system 100 restores the global path by decrypting the encrypted global path using the decryption key (S137). The global path is stored in the memory 112 in the restricted area and is automatically erased when the vehicle goes out of the restricted area.

The control system 100 controls an autonomous driving device 260 shown in FIG. 6 such that the vehicle autonomously drives along the global path in the restricted area. The vehicle autonomously drives to the destination in the restricted area along the global path received from the server 2000 and performs local planning in real time on the basis of sensor data and the global path while autonomously driving.

The control system 1000 can restore an updated global path using an updated decryption key received from the server 200 when the vehicle goes out of the restricted area, and can control the autonomous driving device 260 on the basis of the updated global path.

The path planner 108 of the autonomous driving system 1000 generates a local path by performing local planning on the basis of the sensor data and the global path received from the sensor system 102 (S138). The sensor system 102 is linked with the objection detection device 210 and generates sensor data including landform information and object detection information around the vehicle while the vehicle is driven along the global path in the restricted area. The path planner 108 generates a local path on the basis of output data of the sensor system 102 and the global path. The local path includes route information of the vehicle within the detection range of the sensor system 102.

The path planner 108 can update the local path in real time in accordance with the surrounding landform information and the object information from the sensor system 102 and can correct the local path when a pedestrian is detected by the recognition system 110.

The recognition system 110 is linked with a pedestrian collision system, so it recognizes a pedestrian around the vehicle in the restricted area and provides it to the path planner 108. When pedestrian who has a possibility of collision in the restricted area is recognized, the path planner 108 controls the vehicle to stop or perform an evasive maneuver.

The memory 112 stores information acquired in the restricted area, including the global path and the local path under control of the control system 100. When the vehicle goes out of the restricted area, all the information acquired in the restricted area and stored in the memory 112 is removed. The information acquired in the restricted area may include the global path, the local path, various sensor data generated from the sensor system 102 in the restricted area, etc.

Figure 13:
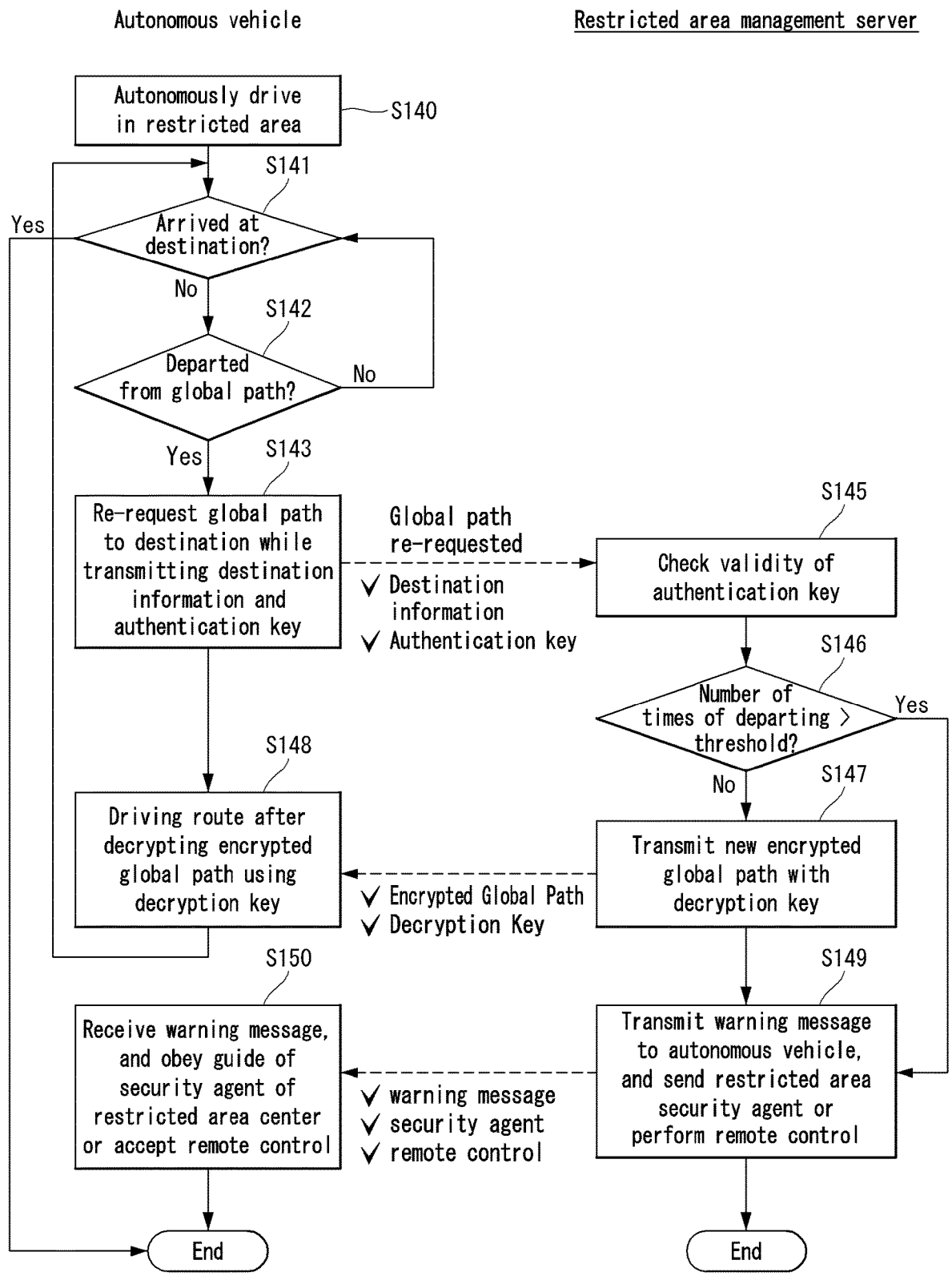
FIG. 13 is a flowchart showing an autonomous driving control method when departing from a global path provided by a restricted area management server.

FIG. 13 is a flowchart showing an autonomous driving control method when departing from a global path provided by the server 2000.

Referring to FIG. 13, the autonomous driving system 1000 guides autonomous driving of the vehicle along the global path in the restricted area (S140). When the vehicle departs from the global path, the control system 100 of the autonomous driving system 1000 retransmits the destination and the authentication key together with the current location of the vehicle to the server 2000 and requests again a global path to the destination.

The server 2000 checks validity of the authentication key received again in the restricted area, and when the authentication key is valid, generates and encrypts a global path from the current location of the vehicle to the destination under the condition that the number of times of departing from the global path is a predetermined threshold or less, and transmits the global path together with a decryption key to the autonomous driving system 1000 (S145, S146, and S147). The server 2000 counts, accumulates, and compares the number of times of departing from the global path with the threshold every time a global path re-request is received in the restricted area.

The server 2000 provides a global path that has been searched for again and updated when the vehicle departs from the global path to the autonomous driving system 1000, and when the vehicle departs from the global path by the number of times larger than a predetermined threshold, the server 2000 determines that it is a suspicious situation and can take follow-up measures. For example, when the corresponding vehicle departs from the global path over three times, the server 200 can report a suspicious situation to a restricted area management center and can request follow-up measures. As an example of the follow-up measures, it is possible to transmit a warning message to the corresponding vehicle, dispatch a security agent to the location of the corresponding vehicle to check the suspicious situation, or forcibly control the driving mode of the corresponding vehicle into remote control.

The autonomous driving system 1000 can restore the global path received again and encrypted when the vehicle departs from the global path using the decryption key and can restart autonomous driving along the updated global path (S148).

When the number of times of departing the global path is larger than the threshold, the server 2000 transmits a warning message to the autonomous driving system 1000. Further, the server 2000, if necessary, can directly control driving of the vehicle by checking a suspicious situation by sending a security agent to the vehicle, and by converting the driving mode of the vehicle into a remote control mode (S149).

The autonomous driving system 1000 receives the warning message received when the number of times of departing the global path is larger than the threshold, and can obey guide of the security agent dispatched from the restricted area management center or can accept remote control by transferring the control right on the vehicle to the server 2000 (S150). The server 2000 receives the control right from the autonomous driving system 1000 and converts the driving mode of the vehicle into the remote control mode, thereby being able to directly control driving of the vehicle.

The restricted area management center needs measures that can prevent leakage of the information that the autonomous driving system 1000 has acquired in the restricted area. To this end, the server 2000 can install a security program in the autonomous driving system 1000 of a vehicle that enters the restricted area. The server 2000 can allow a vehicle to enter the restricted area by opening the entrance gate only when the security program is installed in the vehicle and all security measures are completed.

The security program can change the rights of all non-volatile memories in the autonomous driving system 1000 into 'read only' or unmount the memories. The 'unmount' is a system command that removes corresponding hardware from system components.

Accordingly, when the security program is executed, the autonomous driving system 1000 cannot access the unmounted memories.

The security program can block data transmission to an external network from the autonomous driving system 1000. Accordingly, when the security system is executed, the autonomous driving system 1000 cannot transmit any information acquired in the restricted area such as the global path, the local path, and the sensor data to an external network.

The security program allows an encrypted security network connection between the autonomous driving system 1000 and the server 200, thereby being able to enable the autonomous driving system 1000 of a vehicle allowed to enter the restricted area to request authentication and a global path.

When the vehicle goes out of the restricted area, the security program can lift all the security measures described above.

Figure 14:
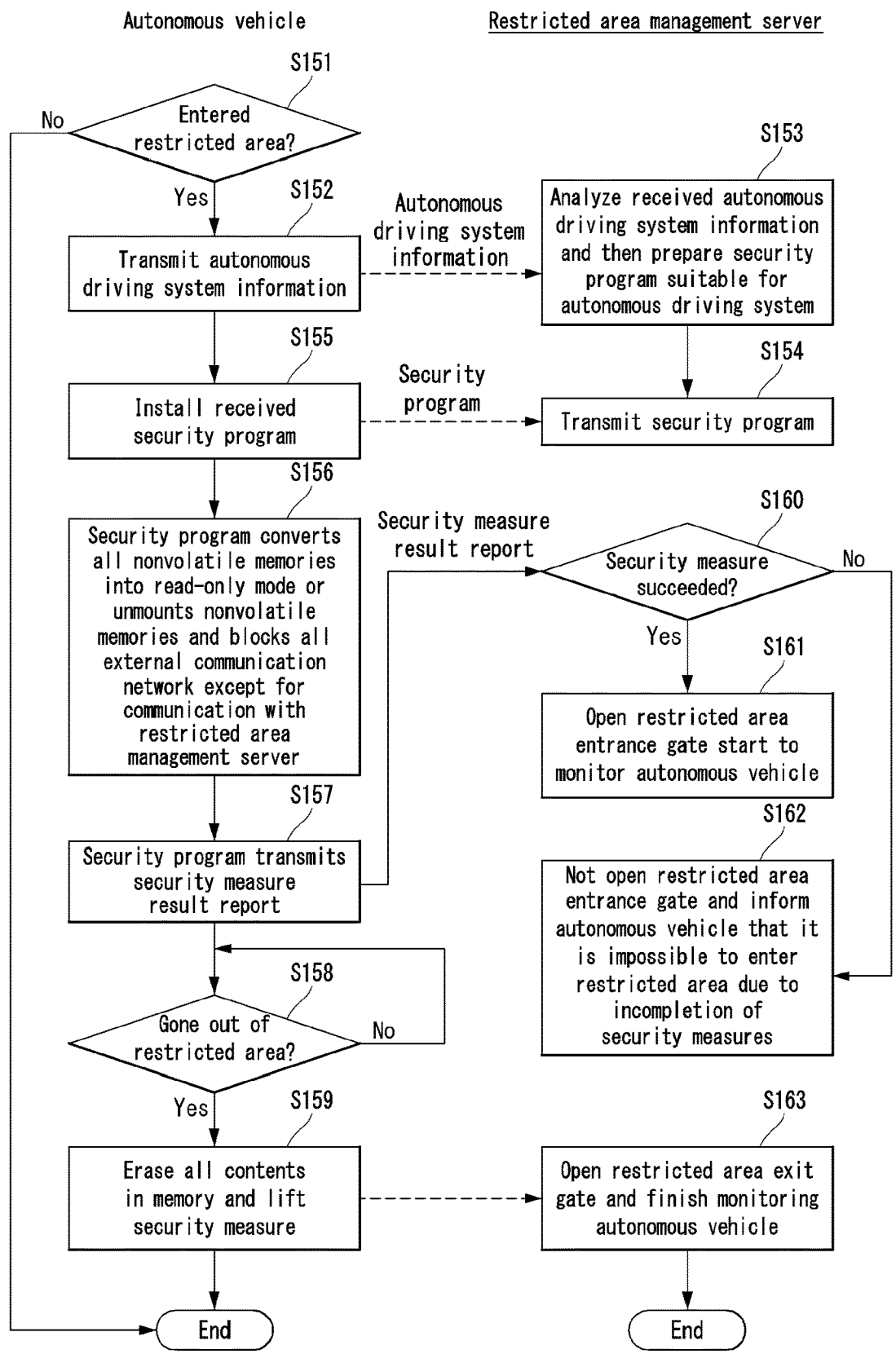
FIG. 14 is a flowchart showing a method of managing information obtained within a restricted area.

FIG. 14 is a flowchart showing a method of managing information obtained within a restricted area.

Referring to FIG. 14, the autonomous driving system 1000 of a vehicle that wants to enter the restricted area transmits system information to the server 200 before entering the restricted area (S151 and S152).

The server 2000 analyzes the system information of the autonomous driving system 1000 and prepares a security program suitable for the autonomous driving system 1000 of the corresponding vehicle (S153). The server 2000 transmits a security program to the autonomous driving system 1000 and the autonomous driving system 1000 installs the security program (S154 and S155).

The security program installed in the autonomous driving system 1000 converts all of nonvolatile memories, which the autonomous driving system can access, into a read-only mode or unmounts the nonvolatile memories. Further, the security program controls the autonomous driving system 1000 such that the autonomous driving system 1000 cannot transmit information through an external network by blocking all external networks except for communication with the server 2000 (S156).

The security program transmits a report on a security measure result to the server 2000 when all security measures are completed (S157). When determining that all security measures have been completed in response to the report on the security measure result, the server 2000 opens an entrance gate of the restricted area and starts to monitor the vehicle (S160 and S161).

When there is an incomplete security measure in response to the security measure report, the server 2000 does not open the entrance gate and transmits a message saying that it is impossible to enter the restricted area due to incompletion of security measures to the autonomous driving system 1000.

When all the security measures are completed by the security program, the vehicle can enter the restricted area through an exit gate of the restricted area. When the vehicle approaches the exit gate of the restricted area before going out of the restricted area, the security program transmits a message saying that the vehicle goes out to the server 2000, erases all of data stored in a erasable memory 112, to which access has been allowed, from the autonomous driving system 1000, and lifts all the security measures (S159). The server opens the exit gate in response to the message saying that the vehicle goes out. When the vehicle goes out of the restricted area through the exit gate, the server finishes monitoring the vehicle.

Figure 15:
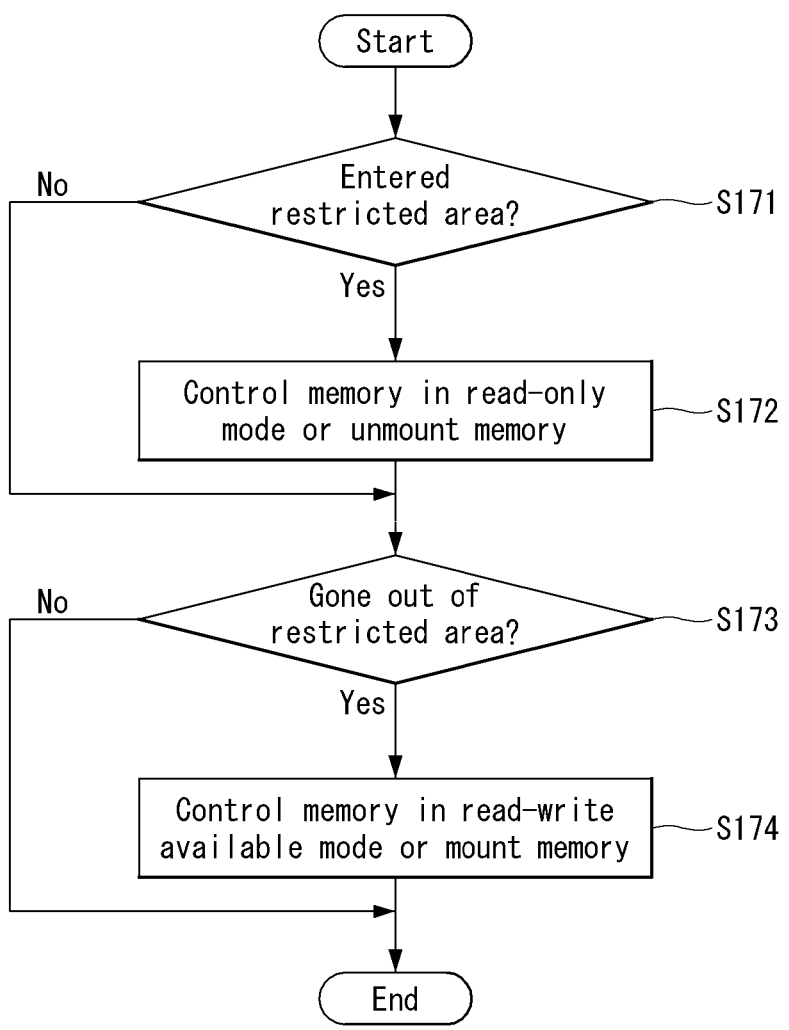
FIGS. 15 and 16 are flowcharts showing a memory control method of an autonomous driving system in a restricted area.
Figure 16:
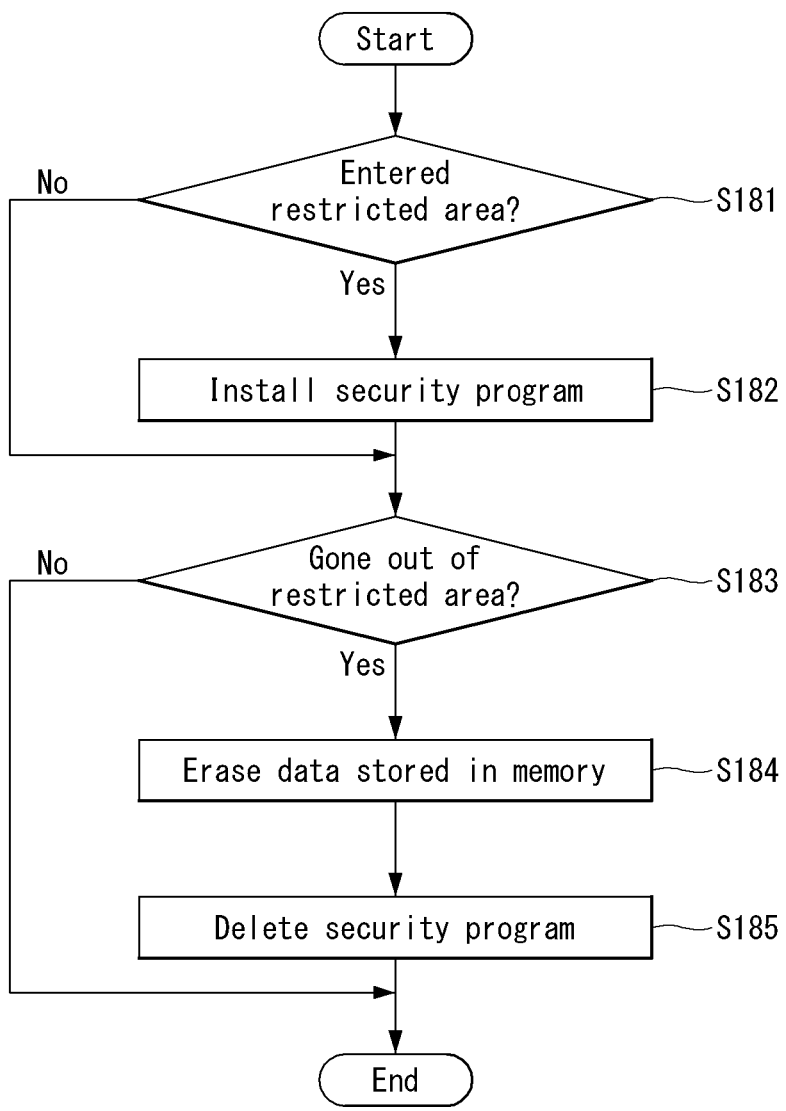

FIGS. 15 and 16 are flowcharts showing a memory control method of the autonomous driving system 1000 in a restricted area.

Referring to FIG. 15, the server 2000 converts the memories except for the erasable memory 112, to which access has been allowed, into a read-only mode or unmounts the memories in the restricted area autonomous driving mode of the vehicle allowed to go out of the restricted area (S171 and S172).

When the vehicle goes out of the restricted area, the server 2000 converts the memories to which access has been blocked into a read-write available mode or mounts the memories. The 'mount' is a system command that installs corresponding hardware in system components.

Referring to FIG. 16, the server 2000 installs a security program in the autonomous driving system 1000 of a vehicle that wants to enter the restricted area (S181 and S182).

When the vehicle goes out of the restricted area, the security program installed in the vehicle can erase and delete all data stored in the memory 112 (S183, S184, and S185).

Various embodiments of an autonomous driving control method in a restricted area of the present disclosure are briefly and simply described as follows.

Embodiment 1

The autonomous driving control method in a restricted area includes: converting a driving mode of a vehicle into a restricted area autonomous driving mode, in which memory access, communication between the vehicle and an external network, and information acquisition are restricted, when the vehicle enters a restricted area; transmitting a destination in the restricted area and an authentication key to a restricted area management server in the restricted area by an autonomous driving system of the vehicle; checking validity of the authentication key, and generating a global path including route information to the destination in the restricted area when the authentication key is valid, by the restricted area management server; encrypting the global path and transmitting a decryption key of the global path together with the encrypted global path to the autonomous driving system by means of the restricted area management server; and restoring the encrypted global path using the decryption key by of the autonomous driving system.

Embodiment 2

The method further includes: autonomously driving to the destination in the restricted area along the global path by of the vehicle; and generating a local path including autonomous driving route information of the vehicle within a detection range of a sensor system on the basis of landform information and object detection information acquired by the sensor system of the vehicle.

Embodiment 3

The method further includes performing an evasive maneuver of the vehicle by updating the local path to stop the vehicle or prevent a collision with a pedestrian when the pedestrian is detected in the restricted area by a recognition system of the vehicle.

Embodiment 4

The method further includes: storing the global path, the local path, and various sensor data generated from the sensor system in the restricted area only in a predetermined erasable memory by of the autonomous driving system; and erasing data stored in the erasable memory when the vehicle goes out of the restricted area.

Embodiment 5

The method further includes: transmitting a current location of the vehicle, the destination, and the authentication key to the restricted area management server by of the autonomous driving system when the vehicle departs from the global path in the restricted area; transmitting the destination in the restricted area and the authentication key to the restricted area management server by of the autonomous driving system of the vehicle; checking validity of the authentication key, and generating an updated global path including route information to the destination from the current location of the vehicle when the authentication key is valid and the number of times of departing the global path is a predetermined threshold or less, by of the restricted area management server; encrypting the updated global path and transmitting a decryption key of the updated global path to the autonomous driving system by of the restricted area management server; restoring the updated global key using the decryption key of the updated global path by of the autonomous driving system; and controlling autonomous driving of the vehicle along the updated global path by of the autonomous driving system.

Embodiment 6

The method further includes transmitting a warning message to the autonomous driving system by of the restricted area management server when the number of times of departing from the global path is larger than a predetermined threshold.

Embodiment 7

The method further includes sending a security agent to the vehicle by of the restricted area management server when the number of times of departing from the global path is larger than a predetermined threshold.

Embodiment 8

The method further includes directly controlling driving of the vehicle by receiving a control right from the autonomous driving system and by converting a driving mode of the vehicle into a remote control mode by of the restricted area management server when the number of times of departing from the global path is larger than a predetermined threshold.

Embodiment 9

The method further includes: transmitting system information by of the autonomous driving system when entering the restricted area; transmitting a security program suitable for the autonomous driving system to the autonomous driving system by analyzing the system information by of the server; and blocking access to a nonvolatile memory of the autonomous driving system and performing security measures for blocking communication between the autonomous driving system and the external network by of the security system installed in the autonomous driving system.

Embodiment 10

The method further includes: transmitting a report including a security measure result to the server by of the security system when all security measures are completed; allowing the vehicle to entire the restricted area by opening an entrance gate of the restricted area and starting to monitor the vehicle when determining that all the security measures have been completed as a result of analyzing the report, by of the server; and transmitting a message informing the autonomous driving system that it is impossible to enter the restricted area to the autonomous driving system without opening the entrance gate when determining that there is an incomplete security measure as the result of analyzing the report, by of the server.

Embodiment 11

The method further includes converting all nonvolatile memories connected with the autonomous driving system into a read-only mode or unmounting the nonvolatile memory by of the security program.

Embodiment 12

The method further includes erasing all of data stored in the erasable memory, to which access has been allowed, from the autonomous driving system, and lifting all the security measures by of the security program when the vehicle goes out of the restricted area.

Embodiment 13

The method further includes: transmitting a vehicle-going out message saying that the vehicle goes out, erase all the data stored in the erasable memory, and lifting all the security measures by of the security program when the vehicle reaches an exit gate of the restricted area; and opening the exit gate of the restricted area in response to the vehicle-going out message and finishing monitoring the vehicle by of the server.

Embodiments of the autonomous driving system are as follows.

Embodiment 1

The autonomous driving system of a vehicle includes: a requester that transmits a destination in a restricted area and an authentication key to a restricted area management server; a receiver that receives an encrypted global path and a decryption key from the restricted area management server; a control system that converts a driving mode of the vehicle into a restricted area autonomous driving mode, in which memory access, communication between the vehicle and an external network, and information acquisition are restricted, and restores a global path by decrypting the encrypted global path using the decryption key received through the receiver, when the vehicle enters the restricted area; and an autonomous driving device that processes autonomous driving of the vehicle along the global path in the restricted area under control by the control system.

Embodiment 2

The restricted area management server checks validity of the authentication key, generates the global path when the authentication key is valid, and generates a global path including route information to the destination in the restricted area. The restricted area management server encrypts the global path and transmits a decryption key of the global path together with the encrypted global path to the autonomous driving system. The global path includes route information to the destination in the restricted area.

Embodiment 3

The autonomous driving system further includes: a sensor system that generates sensor data including surrounding landform information and object detection information of the vehicle; and path planner that generates local path information including autonomous driving route information of the vehicle within a detection range of the sensor system on the basis of the global path and the sensor data received from the sensor system.

Embodiment 6

The autonomous driving system further includes a recognition system that recognizes a pedestrian who has a possibility of a collision with the vehicle when the vehicle is autonomously driven in the restricted area. The path planner updates the local path to stop the vehicle or perform an evasive maneuver of the vehicle when the pedestrian is detected.

Embodiment 7

The autonomous driving system further includes a erasable memory in which the global path, the local path, and sensor data generated from the sensor system. When the vehicle goes out of the restricted area, data stored in the erasable memory are erased.

Embodiment 8

When the vehicle departs from the global path in the restricted area, the control system transmits a current location of the vehicle, the destination, and the authentication key to the restricted area management server.

Embodiment 8

The restricted area management server checks valid of the received authentication key when the vehicle departs from the global path in the restricted area, and generates an updated global path including route information from the current location of the vehicle to the destination when the authentication key is valid and the number of times of departing from the global path is a predetermined threshold or less. The restricted area management server encrypts the updated global path and transmits a decryption key of the updated global path to the autonomous driving system.

Embodiment 9

The control system restores the updated global path using the decryption key of the updated global path, and controls the autonomous driving device on the basis of the updated global path.

The present disclosure provides a global path to an autonomous driving system of an authenticated vehicle allowed to enter a restricted area and an autonomous driving system generates a local pass on the basis of the global path and sensor information. As a result, a vehicle can autonomously move to a desired destination in the restricted area without map data.

The present disclosure can appropriately manage and erase all of information acquired by the vehicle in the restricted area by limiting memories, which the autonomous driving system can access in the restricted area, to an erasable memory and blocking communication with an external network. Accordingly, a restricted area management center can appropriately manage security problems due to an autonomous vehicle entering the restricted area.

A restricted area management server can guide the vehicle again to the destination by transmitting an updated global path to an autonomous driving system of a vehicle when the corresponding vehicle departs from the global path in the restricted area.

The restricted area management server can dispatch a security agent to a vehicle or convert the driving mode of the corresponding vehicle into a remote control mode by determining that it is a suspicious situation when the number of times of departing from the global path of the vehicle is larger than a predetermined threshold.

The effects of the present disclosure are not limited to the effects described above and other effects can be clearly understood by those skilled in the art from the following description.

The present disclosure can be achieved by computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. An autonomous driving control method in a restricted area, the autonomous driving control method comprising:
converting a driving mode of a vehicle into a restricted area autonomous driving mode, in which memory access, communication between the vehicle and an external network, and information acquisition are restricted, when the vehicle enters a restricted area;
transmitting a destination in the restricted area and an authentication key to a restricted area management server by an autonomous driving system of the vehicle;
checking validity of the authentication key, and generating a global path including route information to the destination in the restricted area when the authentication key is valid, by the restricted area management server in the restricted area;
encrypting the global path and transmitting a decryption key of the global path together with the encrypted global path to the autonomous driving system by the restricted area management server; and
restoring the encrypted global path using the decryption key by the autonomous driving system.

2. The autonomous driving control method of claim 1, further comprising:
   autonomously driving to the destination in the restricted area along the global path by the vehicle; and
   generating a local path including autonomous driving route information of the vehicle within a detection range of a sensor system on the basis of landform information and object detection information acquired by the sensor system of the vehicle.

3. The autonomous driving control method of claim 2, further comprising performing an evasive maneuver of the vehicle by updating the local path to stop the vehicle or prevent a collision with a pedestrian when the pedestrian is detected in the restricted area by a recognition system of the vehicle.

4. The autonomous driving control method of claim 2, further comprising:
   storing the global path, the local path, and various sensor data generated from the sensor system in the restricted area only in a predetermined erasable memory by the autonomous driving system; and
   erasing data stored in the erasable memory when the vehicle goes out of the restricted area.

5. The autonomous driving control method of claim 1, further comprising:
   transmitting a current location of the vehicle, the destination, and the authentication key to the restricted area management server by the autonomous driving system when the vehicle departs from the global path in the restricted area;
   transmitting the destination in the restricted area and the authentication key to the restricted area management server by the autonomous driving system of the vehicle;
   checking validity of the authentication key, and generating an updated global path including route information to the destination from the current location of the vehicle when the authentication key is valid and the number of times of departing the global path is a predetermined threshold or less, by the restricted area management server;
   encrypting the updated global path and transmitting a decryption key of the updated global path to the autonomous driving system by the restricted area management server;
   restoring the updated global key using the decryption key of the updated global path by the autonomous driving system; and
   controlling autonomous driving of the vehicle along the updated global path by the autonomous driving system.

6. The autonomous driving control method of claim 5, further comprising transmitting a warning message to the autonomous driving system by the restricted area management server when the number of times of departing from the global path is larger than a predetermined threshold.

7. The autonomous driving control method of claim 5, further comprising sending a security agent to the vehicle by the restricted area management server when the number of times of departing from the global path is larger than a predetermined threshold.

8. The autonomous driving control method of claim 6, further comprising directly controlling driving of the vehicle by receiving a control right from the autonomous driving system and by converting a driving mode of the vehicle into a remote control mode by the restricted area management server when the number of times of departing from the global path is larger than a predetermined threshold.

9. The autonomous driving control method of claim 4, further comprising:
   transmitting system information by the autonomous driving system when entering the restricted area;
   transmitting a security program suitable for the autonomous driving system to the autonomous driving system by analyzing the system information by the server; and
   blocking access to a nonvolatile memory of the autonomous driving system and performing security measures for blocking communication between the autonomous driving system and the external network by the security system installed in the autonomous driving system.

10. The autonomous driving control method of claim 9, further comprising:
    transmitting a report including a security measure result to the server by the security system when all security measures are completed;
    allowing the vehicle to entire the restricted area by opening an entrance gate of the restricted area and starting to monitor the vehicle when determining that all the security measures have been completed as a result of analyzing the report, by the server; and
    transmitting a message informing the autonomous driving system that it is impossible to enter the restricted area to the autonomous driving system without opening the entrance gate when determining that there is an incomplete security measure as the result of analyzing the report, by the server.

11. The autonomous driving control method of claim 10, further comprising converting all nonvolatile memories connected with the autonomous driving system into a read-only mode or unmounting the nonvolatile memory by the security program.

12. The autonomous driving control method of claim 10, further comprising erasing all of data stored in the erasable memory, to which access has been allowed, from the autonomous driving system, and lifting all the security measures by the security program when the vehicle goes out of the restricted area.

13. The autonomous driving control method of claim 10, further comprising:
    transmitting a vehicle-going out message saying that the vehicle goes out, erase all the data stored in the erasable memory, and lifting all the security measures by the security program when the vehicle reaches an exit gate of the restricted area; and
    opening the exit gate of the restricted area in response to the vehicle-going out message and finishing monitoring the vehicle by the server.

* * * * *